(12) United States Patent
Schuller

(10) Patent No.: US 7,924,660 B2
(45) Date of Patent: Apr. 12, 2011

(54) OPTICAL DATA CARRIER

(75) Inventor: Josef Schuller, Salzburg (AT)

(73) Assignee: Sony DADC Austria AG, Anif (AT)

( * ) Notice: Subject to any disclaimer, the term of this patent is extended or adjusted under 35 U.S.C. 154(b) by 788 days.

(21) Appl. No.: 11/452,329

(22) Filed: Jun. 14, 2006

(65) Prior Publication Data

US 2007/0002697 A1   Jan. 4, 2007

(30) Foreign Application Priority Data

Jun. 29, 2005 (EP) .................................. 05014097

(51) Int. Cl.
*G11B 7/085* (2006.01)

(52) U.S. Cl. .................................. 369/30.07; 369/53.34

(58) Field of Classification Search ................... None
See application file for complete search history.

(56) References Cited

U.S. PATENT DOCUMENTS

| 6,748,079 | B1 * | 6/2004 | Downing ....................... 380/201 |
| 6,996,237 | B2 * | 2/2006 | Jensen et al. .................. 380/252 |
| 2003/0074193 | A1 * | 4/2003 | Van Der Vleuten et al. .. 704/219 |
| 2004/0130996 | A1 * | 7/2004 | Reiter et al. ................ 369/59.24 |
| 2004/0196778 | A1 * | 10/2004 | Dierks .......................... 369/286 |
| 2004/0252615 | A1 | 12/2004 | Keech |
| 2005/0190768 | A1 * | 9/2005 | Cutler ......................... 370/395.2 |

FOREIGN PATENT DOCUMENTS

| EP | 1 355 306 A1 | 10/2003 |
| WO | WO 98/38637 | 9/1998 |
| WO | WO 02/095735 A2 | 11/2002 |

OTHER PUBLICATIONS

Anonymous, Full Version: "Is smaller read offset better?", Hydrogenaudio Forums, [Online], Retrieved from the Internet: URL:http://www.hydrogenaudio.org/forums/lo fiversion/index.php/ t29758.html>, XP002384287, Jan. 6, 2005, 9 pages.
Anonymous, Full Version: "Cd drives capable of perfect backups", Hydrogenaudio Forums, [Online], Retrieved from the Internet: URL:http://www.hydrogenaudio.org/forums/lo__fiversion/index. php/_t30302.html>, XP002384289, Apr. 6, 2005, 4 pages.
"Acoustics: In Situ Measurements of Permanently Installed Public Address Systems", Nordtest Method, NT ACOU, No. 108, XP002383951, Jun. 2001, 13 pages.

(Continued)

*Primary Examiner* — Joseph Haley
*Assistant Examiner* — Ifedayo Iluyomade
(74) *Attorney, Agent, or Firm* — Oblon, Spivak, McClelland, Maier & Neustadt, L.L.P.

(57) ABSTRACT

An optical data carrier includes at least one session in which one or more tracks are stored, wherein each session includes a plurality of data frames, and wherein each data frame includes controlling data and content data coded in a first format. In place of at least part of at least one bit sequence which would be included within said content data and which would correspond to constant data with respect to a second format into which said content data would be converted during a reading process, if said one or more tracks had been transferred onto said optical data carrier in accordance with a predetermined CD standard, the at least part of the at least one bit sequence is represented by a bit sequence which does not correspond to constant data with respect to said second format.

24 Claims, 4 Drawing Sheets

OTHER PUBLICATIONS

Pohlmann K C: "Principles of Digital Audio, 3$^{rd}$ Edition", McGraw-Hill, (Fundamentals of Digital Audio), XP002383850, 1995, pp. 40-49, 265-316 (plus cover page).

Prof. Dr. Francesco P. Volpe, et al. "Die Un-CD's So arbeiten Abspielsperren für Audio-CDs", CT Magazin Fuer Computer Technik, Heise Zeitschriften Verlag, vol. 7, XP002244753, 2003, pp. 144-149.

Anonymous, "The super audio CD", Elektor Electronics, vol. 24, No. 269, XP000848729, Sep. 1998, pp. 11-13.

LAB/C'T, "Musikindustrie reagiert auf Filzstift-Hack gegen Audio-Kopierschutz", Heise Online News, [Online], Retrieved from the Internet: URL:http://www.heise.de/newsticker/meldung>, No. 27659, XP002384003, May 26, 2002, 1 page.

* cited by examiner

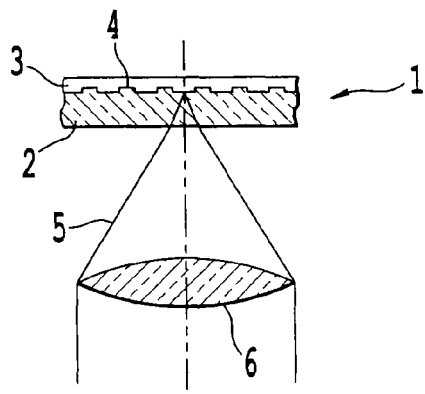
Fig. 1
"Background Art"
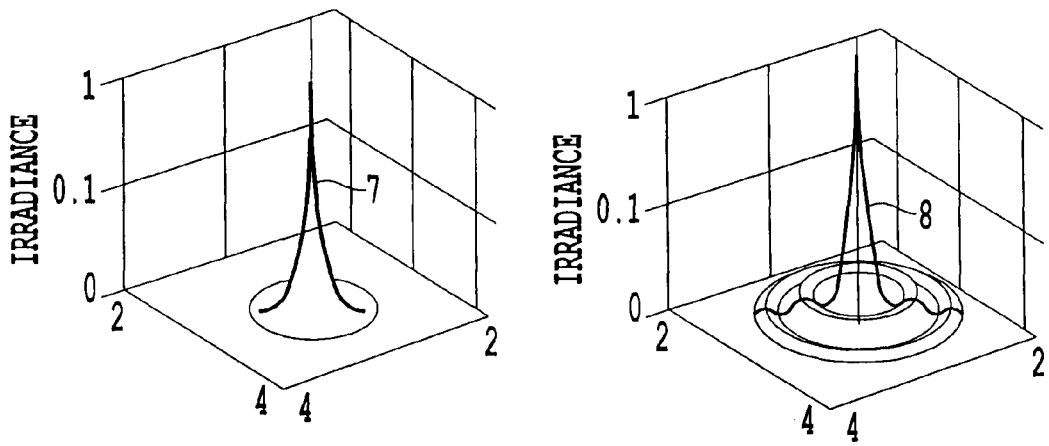
Fig. 2A
"Background Art"
Fig. 2B
"Background Art"

EXAMPLE OF THE LAYOUT OF A MULTI SESSION DISC

| LENGTH | MUSIC | ZERO/PAUSE |
|---|---|---|
| 1T | 0 | 0 |
| 2T | 0 | 0 |
| 3T | 146387 | 187158 |
| 4T | 85965 | 106593 |
| 5T | 73048 | 8877 |
| 6T | 45403 | 3732 |
| 7T | 27891 | 80792 |
| 8T | 21109 | 0 |
| 9T | 19194 | 0 |
| 10T | 7332 | 37961 |
| 11T | 11872 | 14785 |
| 12T | 0 | 0 |
*Fig.5*
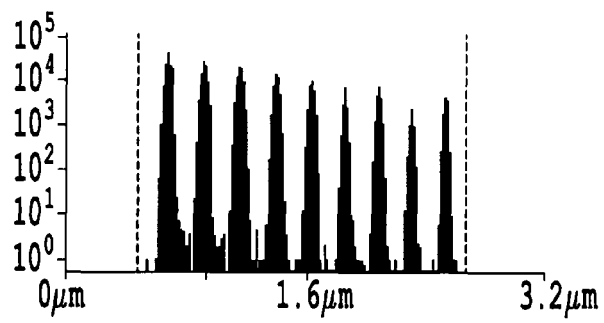
*Fig.6*
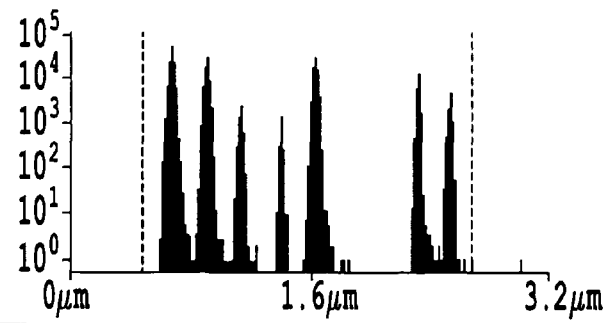
*Fig.7*

OPTICAL DATA CARRIER

BACKGROUND OF THE INVENTION

1. Field of the Invention

The invention relates to an optical data carrier as well as to a method and signal being suitable for recording track data onto an optical data carrier.

2. Discussion of the Background

FIG. 1 shows a schematical drawing of a well known optical data carrier, a CD (compact disk) 1. The CD 1 comprises a transparent substrate layer 2 and a reflective information layer 3. The CD 1 contains a spiral shaped path of successive shallow depressions 4, also called pits, in the reflective information layer 3. Encoded information is stored in the lengths of the pits 4 and in the distances between the pits 4. During playback of the CD 1 a scanning light spot 5 which is focused by an objective lens 6 is diffracted by the pits 4 in the reflective information layer 3. The optical power that is diffracted back into the objective lens 6 is modulated according to the information encoded within the reflective information layer 3. The optical power that is diffracted back into the objective lens 6 is converted into a photo current also called high frequency (HF) signal.

Generally, the arrangement of the optical system which generates the scanning light spot and which comprises the objective lens 6 is optimized for predetermined thickness values of the substrate layer 2. This causes a problem if the thickness values of a CD do not fulfill the thickness assumptions made. In this case, an undesired effect called "spherical aberration" occurs: Normally, the irradiation distribution of the scanning light spot 5 shows a distribution referenced with the reference numeral 7 (FIG. 2a). In the case of spherical aberration, the irradiation distribution of the scanning light spot 5 shows a distribution referenced with the reference numeral 8 (FIG. 2b). The irradiation distribution 8 leads to a high "jitter" (the standard deviation of time length variations between leading and trailing edges of specific pits 4 or lands (areas between the pits 4), measured at reference scanning velocity). A high jitter, however, may lead to a weak high frequency signal which can not be properly processed.

The problem described above concerns all types of CDs: the CD-DA (Compact Disc Digital Audio), the CD-ROM (Compact Disc Read Only Memory) or the SA-CD (Super Audio Compact Disc).

SUMMARY OF THE INVENTION

It is an objective of the present invention to provide an optical data carrier having a CD session which ensures a correct reading process of data stored on the optical data carrier, in particular in the CD session, even if due to a high jitter or due to other factors the high frequency signal is weak.

In order to solve this objective, the present invention provides optical data carriers. Further, the present invention provides a method for recording an audio track data onto an optical data carrier. Last, the present invention provides a signal. Preferred embodiments and further features of the present invention are defined herein.

An optical data carrier according to the present invention comprises at least one CD session in which one or more tracks (to be understood as program items in the scope of the invention) are stored, wherein each session consists of a plurality of data frames, each of which comprising controlling data and content data coded in a first format. According to the present invention, in place of at least part of at least one bit sequence which would be included within the content data and which would consist of a periodic bit pattern or a substantially periodic bit pattern in respect of the first format if said one or more tracks had been transferred onto the optical data carrier in accordance with a predetermined CD standard, the at least part of the at least one bit sequence is represented by a bit sequence of reduced periodicity, for example a bit sequence of no or almost no periodicity.

The present invention is in particular applicable to the following case: In place of at least part of at least one bit sequence which would be included within the content data of the first format and which would correspond to constant data in respect of a second format into which the content data would be converted during a reading process if said one or more tracks had been transferred onto the optical data carrier in accordance with a predetermined CD standard, the at least part of the at least one bit sequence is represented by a bit sequence which does not correspond to constant data in respect of the second format. In the following description, all embodiments will be discussed in conjunction with the case of bit sequences corresponding to constant data in respect to the second format. However, those embodiments are also applicable to the more general case of bit sequences which consist of a periodic bit pattern or a substantially periodic bit pattern in respect of the first format.

In the context of the present invention, "transferring tracks onto the optical data carrier in accordance with a predetermined CD standard" means to transfer the track data as well as information correlated to the tracks (like lead in information, lead out information) onto the optical data carrier according to rules coinciding with the rules of the predetermined CD data standard. For example, according to the IEC 908 standard or to the ISO/IEC 10149 standard, if two audio tracks belonging to one "CD-DA" (pure audio) session are transferred (burned or pressed) onto the optical recording medium, the content data of correlated lead in information, lead out information, pause data within (at the beginning of) the tracks, etc. which is also transferred onto the recording medium is usually created according to specific standard rules: according to the IEC 908 standard or to the ISO/IEC 10149 standard, this data is constant data (e. g. zero data) in respect of the second format (the lead in information, lead out information, pause data, etc. respectively define a sequence of identical numerical values (zero values) in respect of the second format).

The predetermined CD standard may for example be the IEC 908 standard (Compact Disk Digital Audio System, 1987) and/or the ISO 10149 standard/IEC 10149 standard (Data Interchange On Read-Only Optical Data Disks, 1989). In this case, a) the term "content data" preferably means information data in the sense of the IEC 908 standard or of the ISO 10149 standard/IEC 10149 standard; b) The term "controlling data" preferably means synchronization pattern data and/or correction parity data and/or control and display symbol data in the sense of the IEC 908 standard or of the ISO/IEC 10149 standard; Further, c) the terms "first format" and "second format" are preferably connected by the following transformation relation: content data of the first format is obtained from content data of the second format by a transforming process which comprises at least eight-to-fourteen modulation (EFM) processing in the sense of the IEC 908 standard or of the ISO/IEC 10149 standard. The transforming process further comprises at least a part of interleaving processing in the sense of the IEC 908 standard or of the ISO/IEC 10149 standard. The transformation process may comprise further possible processing steps which may be performed in accordance with the IEC 908 standard or of the ISO/IEC 10149 standard before correction parity data and display data (which are both controlling data) is added to the content data.

According to the IEC 908 standard or the ISO/IEC 10149 standard, content data (user content data) is generally subjected to interleaving processing using the following content data processing scheme/controlling data generating scheme:
1. providing user content data
2. interleaving processing step A
3. calculate check sum (correction parity data) step A
4. interleaving processing step B
5. calculate check sum (correction parity data) step B
6. interleaving processing step C
7. calculate check sum (correction parity data) step C
8. add control and display symbol data
9. perform EFM modulation
10. add synchronization pattern data
11. add merge bits Then, the resulting stream of controlling data and content data is transferred onto the disc.

In this case, the term "content data of the second format" means content data which has not been subjected to steps 3 to 11 so far. That is, the transforming process which transforms the content data of the second format into the content data of the first format comprises interleaving processing steps B and C, and may additionally comprise interleaving processing step A.

As far as the IEC 908 standard and the ISO/IEC 10149 standard are concerned, the term "first format" relates to "16 bit audio sample" data ("user format"), and the term "first format" relates to "channel bits" data ("channel format"). Further, in this context, the term "frame" relates to a "channel bit frame" which is for example shown in FIG. 4.

The present invention can also be applied to other types of standards like SA-CD standards (HybridDisks) or future CD standards or other optical disc standards.

The process of transferring (storing) data onto the optical data carrier may be performed on the basis of a recording process (CD-R/CD-RW) or on the basis of a replication process (prerecorded disks).

The pit pattern formed within the transparent reflective layer represents a bit pattern (bit sequence). The information of the bit sequence is included within the high frequency (HF) signal. A basic principle underlying the present invention is to avoid undesired low frequency components of the high frequency signal which are near to (frame rate frequency, ½ of the frame rate frequency, ¼ of the frame rate frequency, . . . ) or coincide with low frequency components of the high frequency signal used as servo signals for the servo system keeping the scanning light spot on its spiral path. This means that pit patterns showing such low frequency components have to be avoided as much as possible. Otherwise, the scanning light spot would not follow its optimum path (and therefore a high jitter could occur). As a consequence, inaccuracies in the high frequency signal are likely to occur. In the worst case, the scanning light spot could loose its spiral path.

The undesired low frequency components are in particular dominant if the content data represented by the pit pattern is constant in respect of the second format (i.e. if the pit pattern defines a sequence of identical numerical values in respect of the second format), the sequence (which usually consists of a sequence of several bytes) being obtained by subjecting the content data represented by the pit pattern to a reverse eight-to-fourteen-modulation). In this case (depending on the setting of the merge bits), only changes in the control and display symbol data occur from frame to frame or each second, third, or fourth, . . . frame, i.e. the undesired low frequency components show a frequency of the frame rate frequency, ½ of the frame rate frequency, ¼ of the frame rate frequency, . . . ). This effect (the influence of the content data on the servo system) is also known as "intersymbol interference between content data and servo signal data".

Undesired low frequency components do not only occur if the content data represented by the pit pattern is constant in respect of the second format. Rather, pit patterns showing a periodically repeating pit pattern unit or a substantially periodically repeating pit pattern unit are problematic. It is not necessary that all pit pattern units are absolutely identical with respect to each other. However, the "more" identical the pit pattern units are, the more dominant the undesired low frequency components will be. The pit pattern unit may be an arbitrary pit pattern (i. e. correspond to an arbitrary 0/1 bit sequence in respect of the first format). In other words: All bit sequences being part of the content data in respect of the second format have to be avoided which yield to periodic pit sequences in respect to the first format after the format conversion process (8-to-14 modulation and interleaving processing). According to the present invention, the periodicity of the pit pattern is at least partially destroyed. This aim can be achieved by superpositioning the bit sequence with respect to the second format which has to be recorded onto the optical data carrier with a random bit sequence, thereby obtaining the actual bit sequence (second format) which will be transformed into the first format. If the bit sequence relates to data of one or several audio tracks, the bit random sequence can be chosen in accordance with psychoacoustical models such that the change which is effected by the random bit sequence is not or almost not perceivable by the human auditory system.

The inventors found out that, in order to keep the scanning light spot "better" on its spiral path and consequently to avoid inaccuracies in the high frequency signal, a reduction of the interference between the content data and the servo signal data is useful. This reduction is done by "replacing" pit sequences (i.e. digital data) corresponding to constant data in respect of the second format by pit sequences not corresponding to constant data in respect of the second format. In other words: Content data which has to be transferred onto the optical data carrier should not be constant data (a sequence of a fixed numerical value like "0" or "1") before it is subjected to the eight-to-fourteen modulation (i.e. before the content data is converted from the second format (before the modulation) into the first format (after the modulation)). To be more general: Low frequency components in the high frequency signal resulting from pit sequences which consist of a periodic pit pattern or a substantially periodic pit pattern have to be avoided. To avoid low frequency components, only pit sequences showing no or almost no periodicity should be used.

The present invention further provides a method of recording track data onto an optical data carrier comprising at least one session in which one or more tracks are stored, wherein each session consists of a plurality of data frames, each of which comprising controlling data and content data coded in a first format. In place of at least part of at least one bit sequence which would be included within the content data and which would consist of a periodic bit pattern or a substantially periodic bit pattern if said one or more tracks had been transferred onto the optical data carrier in accordance with a predetermined CD standard, the at least part of the at least one bit sequence is replaced by a bit sequence of no or almost no periodicity.

In one embodiment of the present invention, in place of at least part of at least one bit sequence which would be included within said content data of said first format and which would correspond to constant data in respect of a second format into which said content data would be converted during a reading process if said one or more tracks had been transferred onto said optical data carrier in accordance with a predetermined CD standard, the at least part of the at least one bit sequence is replaced by a bit sequence which does not correspond to constant data in respect of the second format.

Last, the present invention provides a signal representing digital data suitable for transfer onto an optical data carrier, the data carrier comprising at least one session in which one or more tracks are stored, wherein each session consists of a plurality of data frames, each of which comprising controlling data and content data coded in a first format. In place of at least part of at least one bit sequence which would be included within the content data and which would consist of a periodic bit pattern or a substantially periodic bit pattern if the one or more tracks had been transferred onto the optical data carrier in accordance with a predetermined CD standard, the at least part of the at least one bit sequence is represented by a bit sequence of no or almost no periodicity.

In one embodiment of the present invention, in place of at least part of at least one bit sequence which would be included within the content data of the first format and which would correspond to constant data in respect of a second format into which the content data would be converted during a reading process if the one or more tracks had been transferred onto the optical data carrier in accordance with a predetermined CD standard, the at least part of the at least one bit sequence is represented by a bit sequence which does not correspond to constant data in respect of the second format.

This signal may for example be supplied to an optical data carrier manufactory in order to manufacture optical data carriers according to the present invention. Since the signal according to the present invention can be supplied to the manufactory via a communication network, it is possible to separate the location where the signal is generated from the location where the optical data carriers are manufactured.

All explanations given in conjunction with the optical data carrier according to the present invention also hold true for the method and the data signal according to the present invention.

BRIEF DESCRIPTION OF THE DRAWINGS

Further features and embodiments of the present invention will be described below while making reference to the accompanying drawings, wherein:

FIG. 1 shows optical principles underlying the read-out process of a CD,

FIG. 2 shows problems occurring when the principle disclosed in FIG. 1 is applied to an optical disc which does not comply with predetermined disk thickness ranges, FIG. 3 shows a schematic drawing illustrating possible areas within a CD data sector to which the present invention may be applied to, FIG. 4 shows a schematic drawing illustrating possible areas within a predetermined CD data frame to which the present invention may be applied to.

FIG. 5 shows average numbers of specific pit lengths and land lengths occurring within an audio track comprising zero data/not comprising zero data in respect of the second format.

FIG. 6 shows average numbers of specific pit lengths and land lengths occurring within an audio track not comprising zero data in respect of the second format.

FIG. 7 shows average numbers of specific pit lengths and land lengths occurring within an audio track comprising zero data in respect of the second format.

DESCRIPTION OF THE PREFERRED EMBODIMENTS

Figure 3:
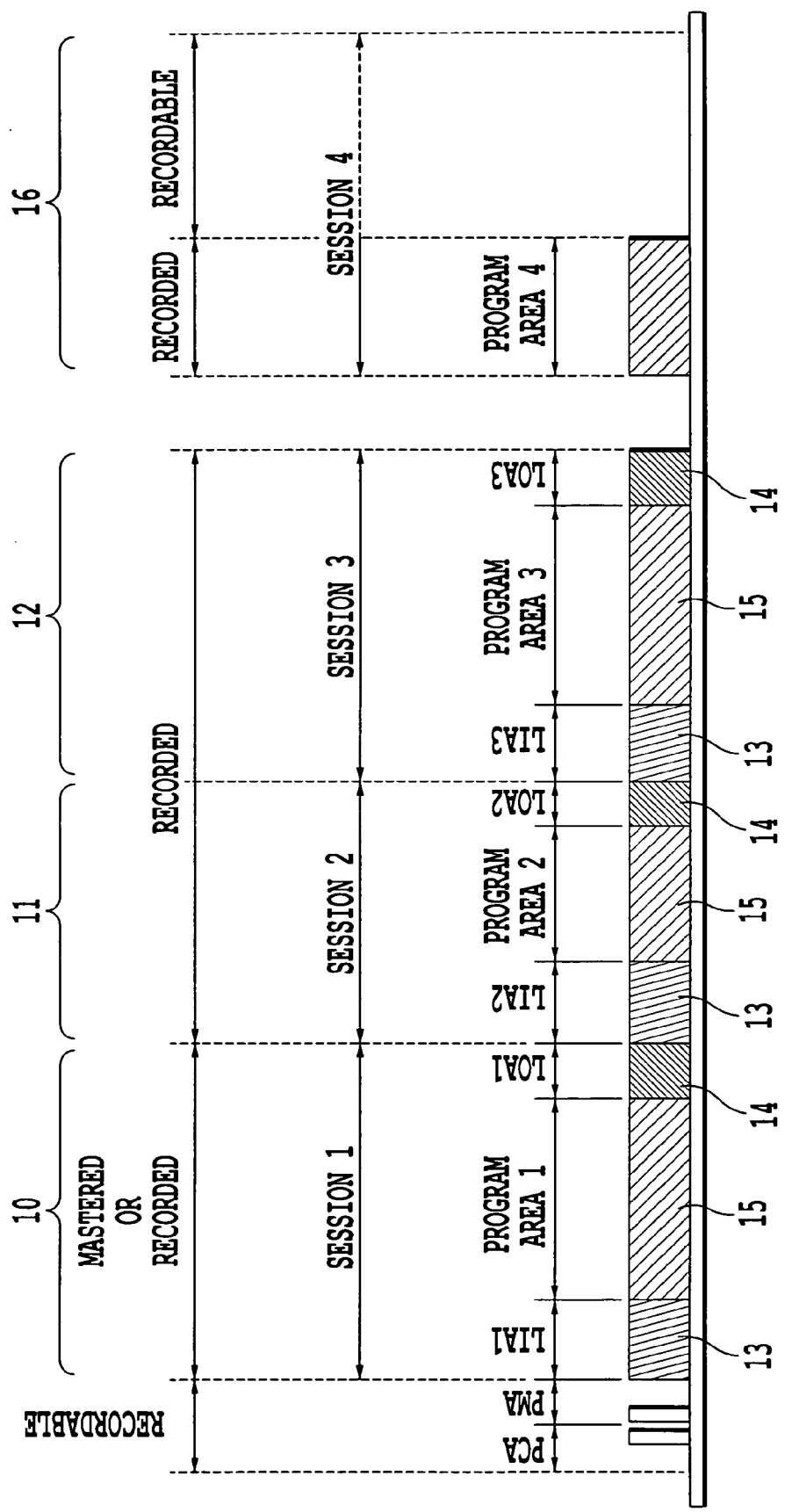

The bit sequences which are avoided to be stored on the optical data carrier according to the present invention (which would correspond to constant data in respect of the second format) may refer to data which would be part of lead in area (LIA) data in the sense of the IEC 908 standard or of the ISO/IEC 10149 standard. Alternatively or additionally, the bit sequences which are avoided to be stored on the optical data carrier according to the present invention (which would correspond to constant content data in respect of the second format) may refer to data which would be part of lead out area (LOA) data in the sense of the IEC 908 standard or of the ISO/IEC 10149 standard. Alternatively or additionally, the bit sequences which are avoided to be stored on the data carrier according to the present invention (which would correspond to constant data in respect of the second format) may refer to data which would be part of digital audio track data (corresponding for example to audio silence within an audio track or to pause data located at the beginning of an audio track.

In the latter case, the bit sequences which are stored on the optical data carrier according to the present invention (which correspond to non constant data in respect of the second format) may be chosen such that a corresponding audio signal fulfils specific requirements of psychoacustic models ensuring that the audio signal can substantially not be perceived by the human auditory system. For example, the bit sequences which are stored on the optical data carrier according to the present invention (which correspond to non constant data in respect of the second format) may be chosen such that a corresponding audio signal is of a low amplitude.

Further, the bit sequences which are stored on the optical data carrier according to the present invention (which correspond to non constant data in respect of the second format) may be chosen such that numerical values (amplitudes) defined by the bit sequences in respect of the second format constitute near zero numerical values. The near zero numerical values (which lie between 32768 and +32767) may for example be advantageous if the bit sequences to be avoided correspond to zero bit sequences (in respect of the second format) located within audio track data. In this case, "perfect audio silence" (zero bit sequence, i.e. zero numerical values) is exchanged by "non perfect audio silence" (near zero numerical values). However, a customer listening to the music may hear almost no difference between audio silence resulting from zero bit sequences in respect of the second format and audio silence resulting from non-zero bit sequences in respect of the second format since the near zero numerical values imply that the corresponding audio signal shows a very low amplitude which is under normal audio conditions almost not perceivable by the human auditory system. The numerical values rep-resent amplitudes have the relative unit "LSB" (Lowest Significant Bit"), the absolute value of this unit being dependent on the power of the respective amplifier.

The bit sequences which are stored on the optical data carrier according to the present invention (which correspond to non constant data in respect of the second format) may be chosen such that a corresponding audio signal is of low amplitude at frequencies in the mid range in respect of frequencies which are perceivable by the human auditory system. The audio signal may be of higher amplitude at frequencies outside the frequency mid range. To be more general, it may be sufficient to use low amplitudes only within the frequency ranges to which the human auditory system is sensitive/highly sensitive.

The bit sequences which are stored on the optical data carrier according to the present invention (which correspond to non constant data in respect of the second format) may be random bit sequences. For example, the bit sequences corresponding to non constant data may at least partially represent pink noise.

Advantageously, but not necessarily, the DC (direct current) content of the sum or a part of the bit sequences corresponding to non constant data (in respect to the second format) is zero or at least as close as possible to zero. Alternatively, the sum of all numerical values (in respect of the second format) being defined by the bit sequence or a part of the bit sequences should be 0.

At least one of the sessions may be a pure audio session which comprises only digital audio tracks. At least one of the sessions may a mixed session which comprises both digital audio tracks and digital data tracks.

The optical data carrier according to the present invention may be a multisession data carrier which includes one pure audio session comprising only audio tracks or one mixed session comprising both audio tracks and data tracks and at least one session comprising only data tracks. In this case, at least one of the sessions comprising only data tracks may include copy protection data (concerning the audio tracks).

If one of the sessions comprising data tracks includes copy protection data concerning the audio tracks, and if the session separation data between the pure audio session (or mixed session) and the first session comprising data tracks (lead out data of audio session and lead in data of the first session comprising data tracks) does not contain periodic patterns (e. g. no constant data with respect to the second format), it is unlikely that the servo system gets disturbed (the scanning light spot looses its optimum scanning path) when scanning the part of the disk containing the session separation data. Therefore, it is ensured that the copy protection data can be accurately read. As a consequence, the copy protection mechanism works as intended (i. e. the audio tracks cannot be copied).

The idea to avoid bit sequences corresponding to constant values (zero values) with respect to the second format or periodic pit sequences may also serve for session-hiding purposes. For example, the bit sequences which correspond to constant data (data contained within the lead out area of the pure audio session or mixed sessions) are replaced to such an extent by bit sequences corresponding to non constant data that the lead out area is generally optically imperceivable to a user and that the optical data carrier complies with the IEC 908 standard and/or the ISO/IEC 10149 standard lead out area rules. The purpose of session hiding is to prevent a user from covering a part of the light incidence surface (corresponding to a session comprising the copy protection mechanism) for example by using a pen, which would mean that a the laser beam (scanning light spot) would not be able to read the copy protection data, thereby disabling the copy protection mechanism.

The present invention may be applied to arbitrary optical data carriers. For example, the optical data carrier may be a disk which comprises an upper disk part in which compact disk data is stored, and a lower disk part in which digital versatile disk data is stored, wherein said at least one session (e. g. one audio session and one or more sessions containing data tracks with copy protection data) is stored in said upper disk part, and wherein the light incidence surface of said compact disk is the upper surface of said upper disk part, whereas the light incidence surface of said digital versatile disk is the lower surface of said lower disk part. Such a disk is known under the terms "DualDisk™"/"DVDPlus™".

Another example of a possible optical data carrier may be a disk which comprises an upper disk part in which compact disk data is stored, and a lower disk part in which super audio compact disk data is stored, wherein said at least one session is stored in said upper disk part, and wherein, in order to read out data stored in said upper disk part and said lower disk part, a laser beam irradiates a common light incidence surface of said upper disk part and said lower disk part which is the lower surface of said lower disk part. Such a disk is known under the term "HybridDisk™".

The present invention may generally be applied to a disk which shows a reflectivity near to a minimum reflexivity value prescribed by the corresponding disk standard like the IEC 908 standard or the ISO/IEC 10149 standard or another CD standard, since a reduced reflectivity leads to a weak high frequency signal.

FIG. 3 shows an example of the layout of a multi-session disc complying with the ISO/IEC 10149 standard. The disc comprises three sessions 10, 11 and 12, each of which comprising a lead in area 13 and a lead out area 14. Each of the sessions 10, 11 and 12 further includes program data areas 15 comprising program information tracks/audio data areas 15 comprising audio data tracks. The disc further comprises a recording section 16 which has not been completed (in contrast to the sessions 10, 11 and 12 which have already been completed). The sessions 10, 11 and 12 may have been generated on the basis of a recording process or a replication process. The recording section 16 is generated on the basis of a recording process in accordance with the ISO/IEC 10149 standard.

According to the present invention, bit sequences which are avoided to be stored on the optical data carrier according to the present invention (which would for example correspond to constant data in respect of the second format) may refer to data which would be part of the lead in areas 13, the lead out areas 14 or the program data areas/audio data areas 15 (i. e. parts of audio tracks (not shown) which are part of the audio data areas 15 or information tracks (not shown) which are part of the program data areas 15).

Of course, all the embodiments discussed above can also be applied to the more general case that the bit sequences avoided to be stored on the optical data carrier relate to periodic or almost periodic bit sequences with respect to the first format.

Figure 4:
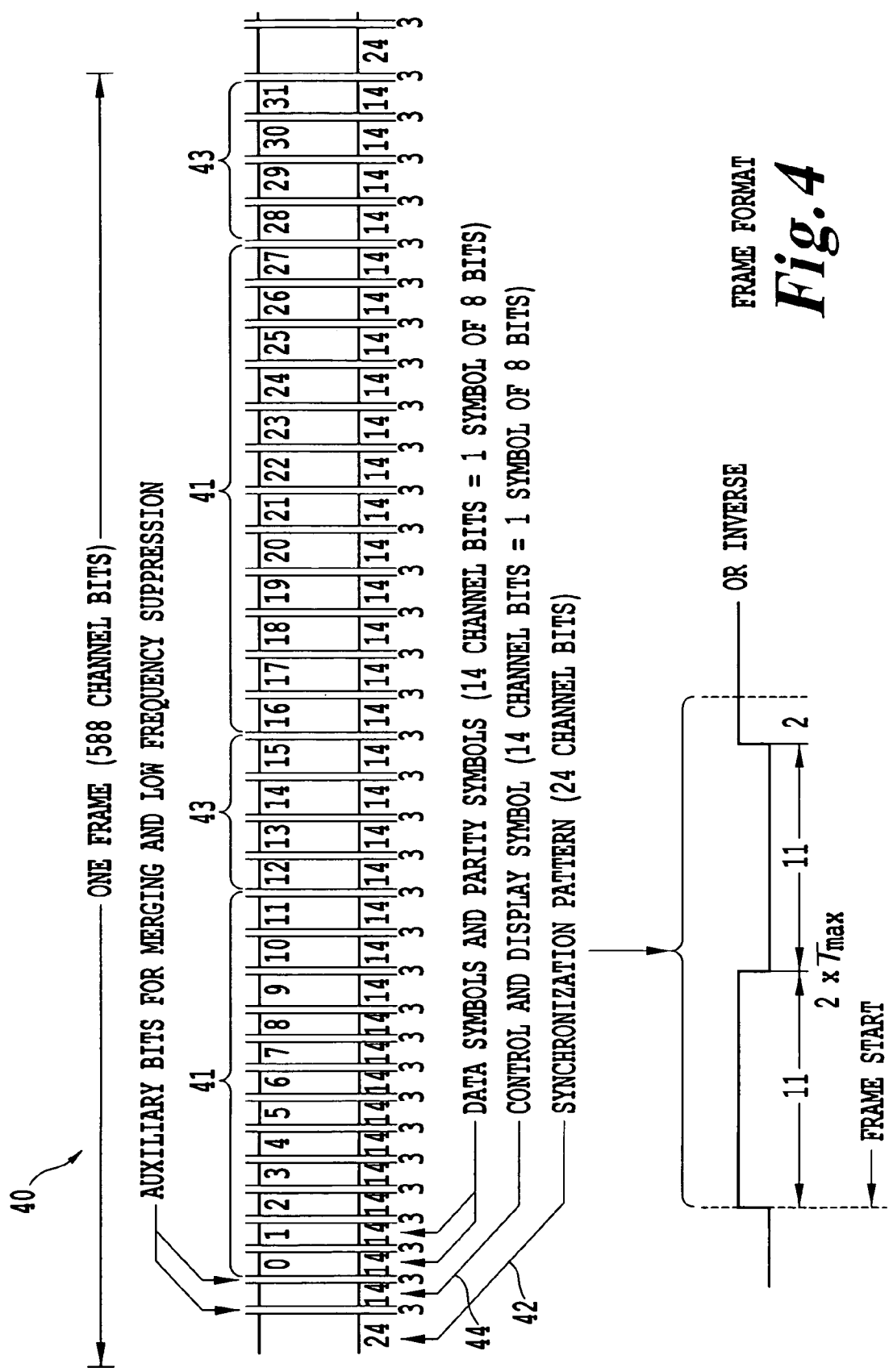

In FIG. 4 the frame structure of the data channel frame (channel bit frame) 40 complying with the IEC 908 standard/ the ISO/IEC 10149 standard is shown. The data channel frame 40 comprises content data (information data) 41 and controlling data (synchronization pattern data 42, correction parity data 43 and control and display symbol data 44. All the data in the lead in areas 13, the lead out areas 14, the program data areas/audio data areas 15 consist of a sequence of data channel frames, each frame showing the structure as illustrated in FIG. 4. Within all those frames (or at least within a part of those frames), according to the present invention, data (or at least a part thereof) which would be included within the information data 41 (coded in the first format) and which would correspond to constant data (in respect of the second format) or show periodic bit patterns or substantially periodic bit patterns in respect of the first format is avoided as much as possible.

In the following description, further aspects of the invention will be explained.

As has become apparent, the present invention provides a method for preventing interference between data content and servo signals in the context of DA compact disks.

The CD-DA format specification (which can be found in the "IEC 908" specification) describes the data format of the CD-family. The basic data structure consists of frames (channel bit frames; see IEC 908, chapter 14 and FIG. 8). 7350 frames occur per second. The error signals for the servo system are overlaid by high frequency components of the EFM (eight to fourteen modulation) pattern. To cancel this influence, low pass filters are used.

Two problems occur in the context of constant information data (also referred to as constant content data):

a) If the information data is constant (e.g. digital silence being part of audio data) there is only a small change from frame to frame (just a control and display data change), so the read out signal shows high amplitudes at a frequency coinciding with the frame rate frequency of 7350 Hz. The read out signal may show high amplitudes at a frequency being lower than the frame rate frequency of 7350 Hz depending on the setting of the merge bits (see IEC 908, chapter 13) which may affect that only each $2^{nd}$ or each $4^{th}$ frame is almost identical. So frequency components will occur in the range where the servo system for optimum tracking (vertical, radial and tangential=data stream synchronization) is reacting to. Therefore, the optimum track following may be disturbed. This disturbance results in a higher jitter of a HF signal and introduces uncorrectable errors at data decoding.

b) Some servo systems for data rate synchronization (spindle servo and EFM-PLL) are using one or more specific pattern (fixed run-length of repeated 1 or 0 bits). If the information data is constant, it might happen that the number of events with the necessary run-length occur very seldom. This situation is indicated in FIG. 5: The table shows that the average numbers of specific pit lengths and land lengths (1T, 2T, . . . , 12T (T is a time unit)) representing bit sequences in respect of the first format which correspond to music data in respect of the second format are different from the average numbers of specific pit lengths and land lengths representing bit sequences in respect of the first format which correspond to data comprising zero data in respect of the second format. FIGS. 6 and 7 illustrate the same situation in a different way (X-axis: length of the pits and lands, Y-axis: numbers of respective specific lengths). As a result, the degree of synchronization may reduce, and EFM jitter may occur.

c) Another problem resulting from changed average numbers of specific pit lengths and land lengths is that those average numbers are used in the process of sampling the photo current signal (high frequency signal): From the average numbers a decision level is derivated. This decision level is used by the EFM-PLL ("EFM slicer" (for details see for example "Compact Disc Reference Measuring Methods Specification Guidline", Chapter 4.7 from Sony-Philips)). Changed average numbers will cause a changed decision level. The changed decision level, however, may lead to synchronization errors in case of a high jitter.

In order to avoid this problem, the bit sequences corresponding to non constant data may be chosen such that a distribution of the lengths of the pits and the lands in the optical data carrier representing the bit sequences comes as close as possible to a distribution of the lengths of the pits and the lands representing ordinary audio data. In this context, the bit sequences corresponding to non constant data may be chosen such that a corresponding audio signal has a maximum amplitude of +/−1 to +/−5 LSB, in particular +/−3 LSB. Those maximum amplitudes avoid significant changes of the average numbers of specific pit lengths.

The specifications of later formats for optical discs like CD-ROM (the specification thereof being described in the ISO/IEC 10149 standard) and DVD take into account this problem; Data scrambling was introduced to avoid such influence on the servo systems.

For compatibility reasons at the CD family every CD type shows constant information data in some regions at the disc: lead in area, lead out and the separation area between sessions (session lead in and session lead out) at multisession discs.

According to the present invention, at some or all areas (content data areas) where constant data with respect of the second format (e.g. digital silence (digital zero bit sequences)) is recorded for a duration "t" (measured before CIRC ("Cross Interleave Reed-Solomon Code") encoding), a random signal (PCM audio data format according to IEC 908) is used to replace the constant data. This destroys the almost constant pattern of the channel frames (in respect of the second format) and reduces the low frequency content of the read out signal strongly.

It should be considered that in this context random signals according to the first format at the disc are concerned, so the interleave of the CIRC encoder (unequal delay of the bytes; see IEC 908 chapter 16) should be taken into account. Preferably, according to the present invention, "t" is smaller than 7 to 10 msec (about ½*max delay of CIRC; ½*(27*4)/7350 seconds). In this case, the HF signal from the disc will not show dominant low frequency content since the interleaving results in well mixing the constant data with non constant data at the same channel-frame. The setting of the value for "t" is up to the user. The DC content of that random signal (PCM audio data) should be zero.

The random signal according to the second format should have the lowest possible amplitude of 1 (+/−1) to be almost inaudible, so it can be used also to replace digital silence.

As a random signal according to the second format digital pink noise (bandwidth up to 22.05 kHz) can be used.

The frequency of the random signal according to the second format should be chosen that it is almost inaudible. For example, the frequency of the random signal according to the second format (to be more general: the frequency of the signal implied by the non zero bit sequences) should not contain frequencies at the mid range (maximum sensitivity of the human ear).

An advantage of the present invention is that the playability of discs having high HF jitter (e.g. optical discs with a lower thickness of the CD-Layer compared to the CD-DA specification) is increased since the servo systems are working more smoothly and don't introduce additional jitter (or PLL locking problems) into the read out signal.

According to the present invention, especially the reading process of TOC (Table Of Contents) data (TOC data is present in the lead in area LIA which normally contains digital silence data) of the $1^{st}$ and succeeding sessions is improved. Further, according to the present invention, the process of positioning the laser beam to the end of pause areas (track start positions) is improved.

According to the present invention, areas containing binary constant data (with respect to the second format) are replaced by areas containing binary non-constant data (with respect to the second format). Doing this, it is possible to avoid optical recognition of such areas ("session hiding": digital silence areas can not be visually identified when looking onto the disc. The read out side of a disc appears homogeneous) and at the same time to avoid synchronisation problems of the laser pickup system within such areas.

In the following description, a preferred embodiment of session hiding will be described.

Copy protection mechanisms like "key2audio" is based on a multisession model. The first session contains AUDIO data, further sessions contain non audio data (copy protection data). The copy protection data enables initialization on multisession capable drives such as CD-ROMs/DVD-ROMs etc.. The following data structure is used:

Leadin $1^{st}$ session
$1^{st}$ session AUDIO data
Leadout $1^{st}$ session AUDIO
Leadin $2^{nd}$ session ROM
$2^{nd}$ session ROM data
Leadout $2^{nd}$ session ROM
...
...

Due to the fact that AUDIO LO (Lead Out) contains a regular zero pattern (to be more general: a constant data pattern) in the main data, the session change from the $1^{st}$ to the $2^{nd}$ session can be optically recognized. In order to avoid session change recognition by end customers, the zero data (constant data) is replaced by non zero data (non constant data) with respect to the second format. For example, the Lead-Out mainform of the first session may be changed according to the present invention partly from AUDIO to ROM as explained detailed in the following paragraph.

Session hiding is partly based on changing the main form of the $1^{st}$ session Leadout. As described, Audio LO contains zero data causing a visible session change. ROM data contains zero data as well but is scrambled within sectors and must be descrambled to readout the data. Scrambled zero data is not constant data (unequal zero), and because of this irregular data the Leadout area isn't visible. Changing the complete Leadout main form of the $1^{st}$ session from AUDIO to ROM may cause compatibility issues, therefore the following structure has been shown to lead to good results (partly modification of AUDIO LO, change mainform to ROM after 4 seconds from $1^{st}$ session LO start):

Leadin $1^{st}$ session
$1^{st}$ session AUDIO data
Start Leadout $1^{st}$ session AUDIO
Start Leadout $1^{st}$ session+4 sec ROM
Start Leadin $2^{nd}$ session ROM
$2^{nd}$ session ROM data
Leadout $2^{nd}$ session ROM
...
...

The afore mentioned session hiding is one application of the more generic principle of avoiding sequences of constant data in the audio region of a CD. Besides avoiding optical recognition of such sequences, it can also be used to avoid synchronisation problems of the servo system of the laser pickup:

When the decoded information data contains a sequence of binary constant data, the respective HF signal includes in special patterns while reading the encoded data on the CD. This so-called "inter-symbol effect" can interfere with the servo system of the laser pickup. As a result, problems in replacing/decoding such data regions may occur.

Typical regions of a CD containing long sequences of constant data (e. g. binary zero data) are (to be understood as examples only):

Lead-In area, containing the Tables Of Content of the respective session (TOC)
Pause gaps "between" the audio tracks
Any silence within an audio track
Lead-Out area (the lead-out area is affected by the session hiding principle listed above)

Any of these regions may appear in any session of a CD, alone or in combination. The length of a sequence of constant data (e. g. binary zero) data which negatively affects server systems may vary between different products.

According to the present invention, constant data (zero data) is replaced with non-constant (almost-zero) data. A single audio sample in the information data consists of 16 bits and covers values from −32768 LSB to +32767 LSB. The higher the absolute value, the higher the amplitude and the "loudness" of the signal. According to the present invention, e. g. sequences of binary zero are intentionally modified to become non-zero data. More specifically, a single audio sample being binary zero is changed to a value near zero. Audio samples with such a low amplitude may under normal circumstances not be heard by human ears and thus are comparable to silence. A further possibility is to toggle the almost-zero data between a negative value near zero and a positive value near zero. A DC part which significantly deviates from zero will also negatively influence the servo system and the laser pickup.

The present invention is generally applicable to each type of optical data carrier, in particular to the dual-disc and the hybrid disc.

REFERENCE SYMBOLS

1 CD
2 Substrate layer
3 Reflective layer
4 Pit
5 Light spot
6 Objective lens
7,8 Irradiation distribution
10,11,12 Session
13 Lead in area
14 Lead out area
15 Program data area
16 Recording section
40 Frame
41 Information data
42 Synchronization pattern data
43 Correction parity data
44 Control and display symbol data

The invention claimed is:

1. An optical data carrier, comprising:
at least one session in which one or more tracks are stored, wherein each session includes a plurality of data frames, and wherein each data frame includes controlling data and content data coded in a first format, wherein
at least a part of at least one bit sequence within said content data is a bit sequence which does not correspond to constant data with respect to a second format and is chosen such that a corresponding audio signal represents a psychoacoustic model ensuring that the audio signal cannot be perceived by the human auditory system;
the second format corresponds to data which is part of lead in area data according to a predetermined CD standard, lead out area data according to the predetermined CD standard, or pause data assigned to a digital audio track; and
content data coded in said first format is obtained from content data coded in said second format by a transformation process which includes at least eight-to-fourteen modulation (EFM) processing according to the IEC 908 standard or the ISO/IEC 10149 standard.

2. The optical data carrier according to claim 1, wherein said predetermined CD standard is the IEC 908 standard and/or the ISO 10149 standard/IEC 10149 standard.

3. The optical data carrier according to claim 2, wherein said content data is information data according to the IEC 908 standard or the ISO 10149 standard/IEC 10149 standard.

4. The optical data carrier according to claim 2, wherein said controlling data is synchronization pattern data and/or correction parity data and/or control and display symbol data according to the IEC 908 standard or the ISO/IEC 10149 standard.

5. The optical data carrier according to claim 1, wherein said bit sequences corresponding to constant data refer to data which would be part of digital audio track data according to the IEC 908 standard.

6. The optical data carrier according to claim 5, wherein said bit sequences corresponding to non-constant data are chosen such that the corresponding audio signal is of a low amplitude.

7. The optical data carrier according to claim 6, wherein said bit sequences corresponding to non-constant data are chosen such that the corresponding audio signal is of low amplitude at frequencies in the mid range in respect of frequencies which are perceivable by the human auditory system.

8. The optical data carrier according to claim 6, wherein said bit sequences corresponding to non-constant data are chosen such that numerical values defined by said bit sequences with respect to said second format constitute near zero numerical values.

9. The optical data carrier according to claim 1, wherein said bit sequences corresponding to non-constant data are random bit sequences.

10. The optical data carrier according to claim 9, wherein said bit sequences corresponding to non-constant data at least partially represent pink noise.

11. The optical data carrier according to claim 1, wherein the DC content of the sum or a part of said bit sequences corresponding to non-constant data with respect to said second format is substantially zero.

12. The optical data carrier according to claim 1, wherein, said bit sequences corresponding to non-constant data are chosen such that a distribution of the lengths of the pits and the lands in the optical data carrier representing said bit sequences corresponds substantially to a distribution of the lengths of the pits and the lands representing ordinary audio data.

13. The optical data carrier according to claim 12, wherein said bit sequences corresponding to non-constant data are chosen such that a corresponding audio signal has a maximum amplitude of +/−1 to +/−5.

14. The optical data carrier according to claim 1, wherein at least one of said sessions is a pure audio session which comprises only digital audio tracks.

15. The optical data carrier according to claim 1, wherein at least one of said sessions is a mixed session which comprises both digital audio tracks and digital data tracks.

16. The optical data carrier according to claim 14, wherein said optical data carrier is a multisession data carrier which comprises one pure audio session comprising only audio tracks or one mixed session comprising both audio tracks and data tracks and at least one session comprising only data tracks.

17. The optical data carrier according to claims 16, wherein at least one of said sessions comprising only data tracks includes copy protection data.

18. The optical data carrier according to claim 1, wherein said bit sequences corresponding to non-constant data contained within said lead out area of one session are replaced to such an extent by bit sequences corresponding to non-constant data that said lead out area is generally optically imperceivable to a user and that the optical data carrier complies with the IEC 908 standard and/or the ISO/IEC 10149 standard lead out area rules.

19. The optical data carrier according to claim 1, wherein the optical data carrier is a disk which comprises an upper disk part in which compact disk data is stored, and a lower disk part in which digital versatile disk data is stored, wherein said at least one session is stored in said upper disk part, and wherein the light incidence surface of said compact disk is the upper surface of said upper disk part, whereas the light incidence surface of said digital versatile disk is the lower surface of said lower disk part.

20. The optical data carrier according to claim 1, wherein the optical data carrier is a disk which comprises an upper disk part in which compact disk data is stored, and a lower disk part in which super audio compact disk data is stored, wherein said at least one session is stored in said upper disk part, and wherein, in order to read out data stored in said upper disk part and said lower disk part, a laser beam irradiates a common light incidence surface of said upper disk part and said lower disk part which is the lower surface of said lower disk part.

21. A method of recording track data onto an optical data carrier that includes at least one session in which one or more tracks are stored, wherein each session includes a plurality of data frames, each of which includes controlling data and content data coded in a first format, the method comprising:
   recording at least a part of at least one bit sequence included within said content data as a bit sequence that does not correspond to constant data with respect to a second format and is chosen such that a corresponding audio signal represents a psychoacoustic model ensuring that the audio signal cannot be perceived by the human auditory system,
   wherein the second format corresponds to data which would be part of lead in area data according to a predetermined CD standard, lead out area data according to the predetermined CD standard, or pause data assigned to a digital audio track; and
   content data coded in said first format is obtained from content data coded in said second format by a transformation process which includes at least eight-to-fourteen modulation (EFM) processing according to the IEC 908 standard or the ISO/IEC 10149 standard.

22. An optical data carrier, comprising:
   at least one session in which one or more tracks are stored, wherein each session includes a plurality of data frames, and wherein each data frame includes controlling data and content data coded in a first format, wherein
   at least a part of at least one bit sequence included within said content data is a bit sequence of no or almost no periodicity with respect to a second format, and is chosen such that a corresponding audio signal represents a psychoacoustic model ensuring that the audio signal cannot be perceived by the human auditory system;
   the second format corresponds to data which would be part of lead in area data according to a predetermined CD standard, lead out area data according to the predetermined CD standard, or pause data assigned to a digital audio track; and content data coded in said first format is obtained from content data coded in said second format by a transformation process which includes at least eight-to-fourteen modulation (EFM) processing according to the IEC 908 standard or the ISO/IEC 10149 standard.

23. The optical data carrier according to claim 6, wherein said bit sequences corresponding to non-constant data are chosen such that the corresponding audio signal is of low amplitude only with the frequency ranges to which the human auditory system is sensitive.

24. The optical data carrier according to claim 1, wherein said bit sequences corresponding to non-constant data are obtained by modifying or replacing data that is constant with respect to the second format.

* * * * *